United States Patent [19]

Ono et al.

[11] Patent Number: 5,119,528
[45] Date of Patent: Jun. 9, 1992

[54] TYING BAND CLUSTER

[75] Inventors: Mamoru Ono; Toshio Okazaki, both of Toyota; Tomohiro Ikeda, Kosai, all of Japan

[73] Assignee: Yazaki Corporation, Tokyo, Japan

[21] Appl. No.: 653,330

[22] Filed: Feb. 11, 1991

[30] Foreign Application Priority Data

Feb. 22, 1990 [JP] Japan ................................ 2-16202[U]
Aug. 29, 1990 [JP] Japan ................................ 2-89475[U]

[51] Int. Cl.⁵ .............................................. F16B 2/08
[52] U.S. Cl. .................................. 24/16 PB; 248/74.3
[58] Field of Search .............. 24/16 PB, 16 R, 17 AP, 24/17 R, 30.5 R, 30.5 P, 17 A; 248/74.3; 100/1, 34; 206/338, 390

[56] References Cited

U.S. PATENT DOCUMENTS 4,079,485  3/1978  Collier et al. ................ 24/30.5 P X

FOREIGN PATENT DOCUMENTS 51-31760  3/1976  Japan .
54-40859  3/1979  Japan .
1-128566  9/1989  Japan .
2103274  2/1983  United Kingdom ............... 24/16 R

*Primary Examiner*—James R. Brittain
*Attorney, Agent, or Firm*—Armstrong, Nikaido, Marmelstein, Kubovcik & Murray

[57] ABSTRACT

A tying band cluster consists of a plurality of tying bands connected in series, end to end, in longitudinal direction. Each of the tying bands has a head portion, a projecting piece formed at one end of the head portion, and a major portion of a band body formed at the other end of the head portion. When a tying band is formed, the projecting piece of the current tying band is fused with the free end of the major portion of the previous tying band. Because the major portion of the previous tying band is left in the molding dies when the next tying band is formed, the major portion of the previous tying band is kept heated and can therefore be fused completely with the projecting piece of the tying band currently being formed. This ensures a solid connection between the tying bands.

3 Claims, 5 Drawing Sheets

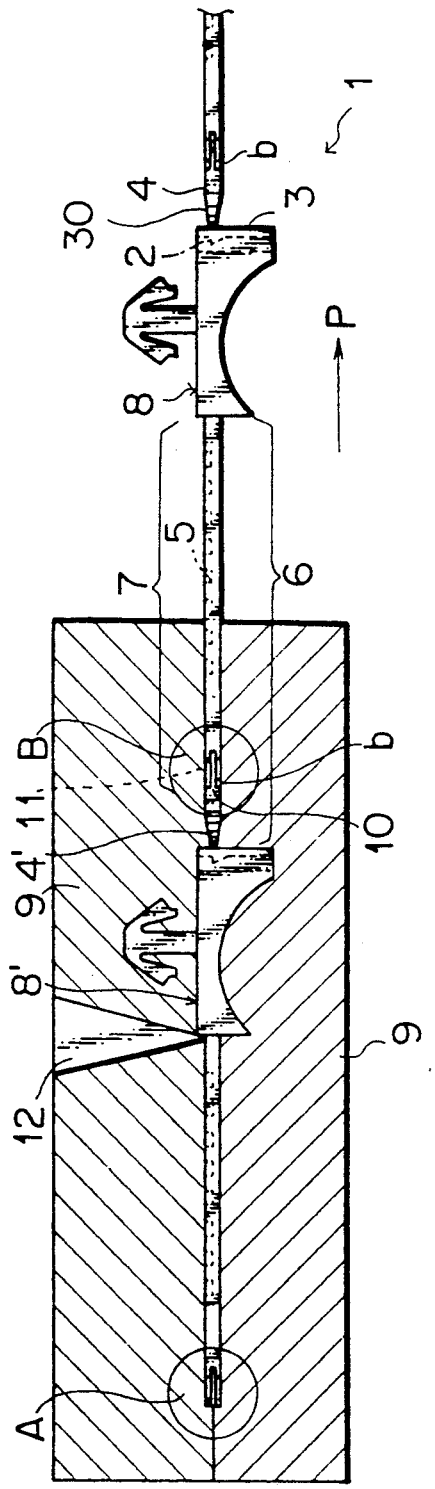
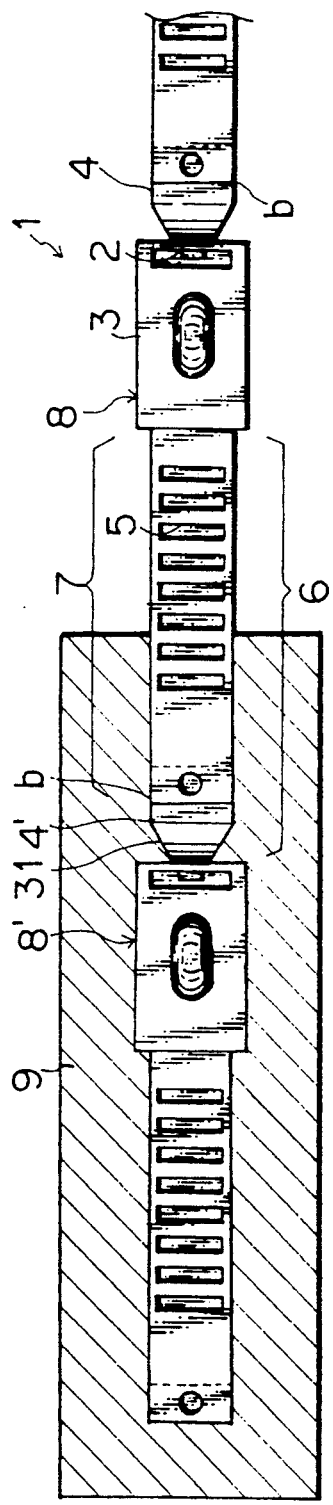

TYING BAND CLUSTER

BACKGROUND OF THE INVENTION

1. Field of the Invention

The present invention relates to a tying band cluster to be loaded in an automatic bundling machine for wiring harnesses.

2. Prior Art

FIG. 8 shows a conventional tying band cluster. The tying band cluster 15 is formed of synthetic resin and has a number of tying bands 20 connected in series. Each band consists of a band body 17 with engagement grooves 16 and a head portion 19 with an engagement hole 18, the band body and the head portion formed as one piece. The tying band 20 has the end of its head portion 19 fused with the end 17a' of a band body 17' of the next tying band 20'. In this way, a number of tying bands are connected longitudinally in series to form a typing band cluster 15.

The individual tying band 20' is formed in one piece by molding dies 21, 21, from the head portion 19' to the end 17a' of the band body 17'. During the molding process, the end of the band body 17' is fused, as indicated by an arrow T, with the end of the head portion 19 of the tying band 20 that was formed previously. In the drawing, denoted 22 is a gate, which is preferably set at the base portion 17b' of the band body 17' which requires a large strength. A direction U represents the direction of feed. Designated 23 is a fixing clip.

During the process of making the above-mentioned tying band cluster 15, however, the head portion 19 of the typing band 20 that was previously formed is already cool when the next band is molded, so that the end 17a' of the band body 17 ' of the next tying band 20' does not easily fuse with the head portion 19 of the previously formed band 20. Hence, when the band cluster 15 is loaded and used in the automatic bundling machine, a connecting portion c may easily get disconnected, bringing the bundling work to a halt.

FIG. 9 shows a tying band cluster disclosed in the Japanese Utility Model Preliminary Publication No. Heisei 1-128566.

The tying band cluster 24 consists of a plurality of parallelly arranged tying bands 25 with their head portions 26 formed continuous with a connecting strip 27. With this construction, connecting portions 29 between the band bodies 28 and the connecting strip 27 are positioned close to the gate (not shown), so that the strength of the connecting portions 29 can be increased.

The tying band cluster 24, however, has a drawback that the connecting strip 27 requires an extra amount of synthetic resin material, raising the cost.

SUMMARY OF THE INVENTION

This invention has been accomplished to overcome the above drawbacks and its objective is to provide a tying band cluster which can prevent possible break of the connecting portions and also reduce the manufacturing cost.

To achieve the above objective, a tying band cluster comprising: a plurality of tying bands connected in series, end to end, in a longitudinal direction; each of said tying bands comprising a band body, a head portion formed at one end of the band body, a projecting piece formed at one end of the head portion, and a major portion of the band body formed at the other end of the head portion; whereby the projecting piece of the currently formed tying band is fused with the free end of the major portion of the previous tying band.

In providing a secure connection between one tying band and the next, it may be effective to form a groove or hole at the end of the major portion of each tying band. It is also possible to form a ladder portion at the end of the major portion, whose stairs are staggered in the direction of the major portion thickness. When the projecting piece of one tying band is fused with the specially shaped end of the major portion of the previous tying band, a secure connection is obtained.

The projecting piece of the tying band being formed is fused with the end of the major portion of the previous band body which is left in the molding dies and kept hot, so that the connecting portion can be completely fused to have a sufficient strength. Forming the groove or hole and the ladder portion at the end of the major portion will result in a complex entanglement of the projecting piece with the major portion end, assuring a further increase in the strength of the connection.

BRIEF DESCRIPTION OF THE DRAWINGS

FIGS. 1a and 1b show one embodiment of this invention, FIG. 1a being a front elevational view and FIG. 1b a plan view (seen from the top);

FIG. 2 an enlarged cross section of part A of FIG. 1a;

FIG. 3 is an enlarged cross section of part B (connecting portion) of FIG. 1a;

FIGS. 9a and 8b show a conventional tying band cluster, with FIG. 8a being a front elevational view and FIG. 8b plan view (seen from the top)

PREFERRED EMBODIMENT OF THE INVENTION

Figure 2:
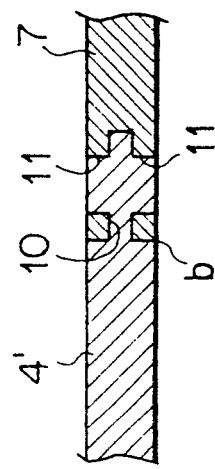

FIG. 1 shows one embodiment of a tying band cluster according to this invention.

The tying band cluster 1 is made of synthetic resin and has a short projecting piece 4 formed integral with one end of a head portion 3 which has an engagement hole 2. At the other end of the head portion 3 a major portion 7 of a band body 6 is formed, the band body having engagement grooves 5 formed therein. The head portion 3 and the band body 6 make up a tying band 8, with the end of the major portion 7 fused together with the end of a projecting piece 4' of the next tying band 8' in molding dies 9, 9 to form a series of tying bands.

The projecting piece 4 is tapered on the base end side as shown at 30. The end of the major portion 7 of the band body 6 is formed with a slit 10 extending widthwise of the body and also with a through-hole 11 extending perpendicular to and communicating with the slit 10, as shown in FIG. 2 which is an enlarged cross section of a part A in FIG. 1a.

Figure 3:
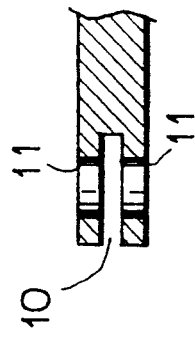

With the end of the major portion 7 left in the molding dies 9 (in a heated condition), the next tying band 8' is formed, so that, as shown in FIG. 3 which is an enlarged cross section of a part B of FIG. 1a, the end of the projecting piece 40' is fused into the slit 10 and the through-hole 11, thus forming a solid connection. Therefore, the connecting portion b has a sufficient strength.

In FIG. 1, denoted 12 is a gate; and an arrow P represents the direction in which the work is fed out of the dies.

Figure 4:
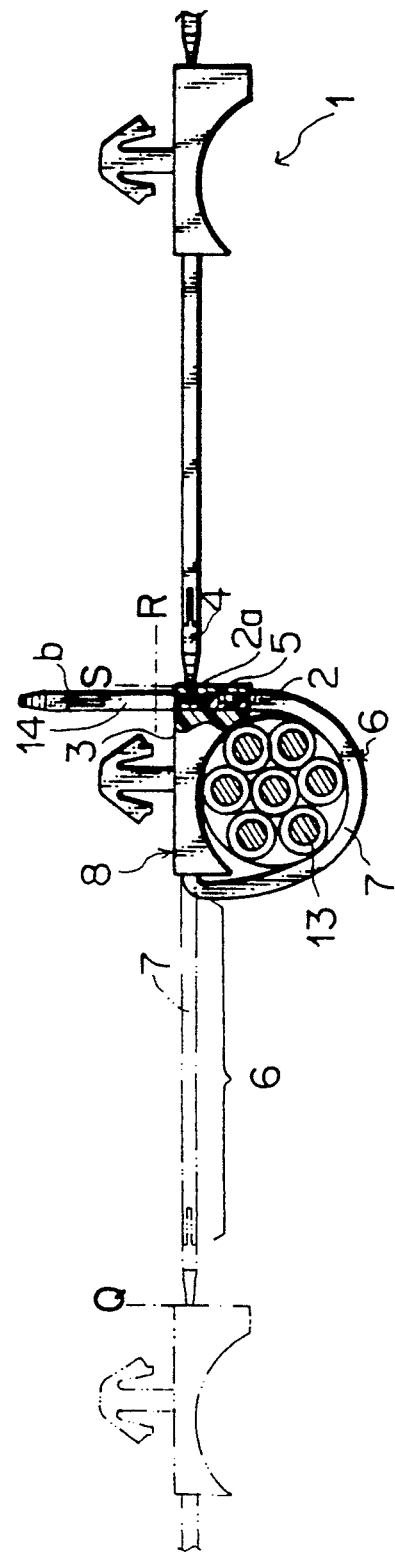
FIG. 4 is a front view showing the tying band bundling wires together.

FIG. 4 shows a wiring harness 13 tied up by a tying band of the tying band cluster 1 using an automatic bundling machine not shown. The process of bundling the wiring harness is explained below.

The end of the band body 6 is cut off at two-dot line Q and the band body 6 is wound around the wiring harness 13 to insert its end through the engagement hole 2 of the head portion 3. The end of the band body 6 is pulled to engage one of the engagement grooves 5 with a claw 2a. The tapered portions 30, 31 at the end of the band body 6 works as a guide for ensuring smooth insertion of the body end into the engagement hole 2. An extra length portion 14 of the band body 6 is cut off at one-dot line R and discarded and at the same time the base end of the projecting piece 4 is cut off along one-dot line S. The extra length portion 14 includes the connecting portion b, so that the connecting portion b will not remain as part of the tying band 8. Hence, the strength of the tying band 8 itself is not weakened by the narrowed connecting portion b.

Figure 5A:
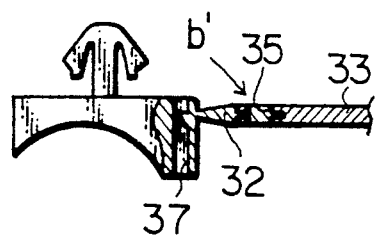
FIGS. 5a and 5b show another example of the connecting portion, with FIG. 5a being a vertical cross section and FIG. 5b a plan view (seen from the top)
Figure 5B:
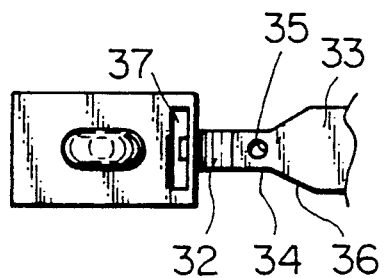

FIG. 5 shows another structure of the connecting portion b', with FIG. 5a being an elevational cross section and FIG. 5b a plan view.

The connecting portion b' is formed as follows. The end of the major portion 33 of the band body is set narrower in width than the remaining part to form a narrow width portion 34. The narrow width portion 34 has a through-hole 35 formed therethrough, into which the end of the projecting piece 32 of the next band is fused. The front part of the major portion 33 joining the narrow width portion 34 is tapered as indicated by 36 to facilitate the insertion into the engagement hole 37.

Figure 6:
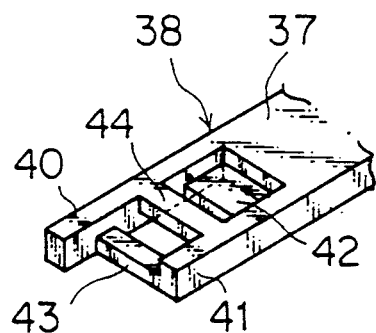
FIG. 6 is a perspective view of still another example of the connecting portion (part A)
Figure 7A:
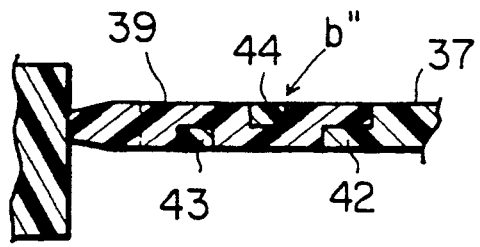
FIGS. 7a and 7b show the connecting portion in a joined state, with FIG. 7a being a vertical cross section and FIG. 7b a plan view (seen from the top)
Figure 7B:
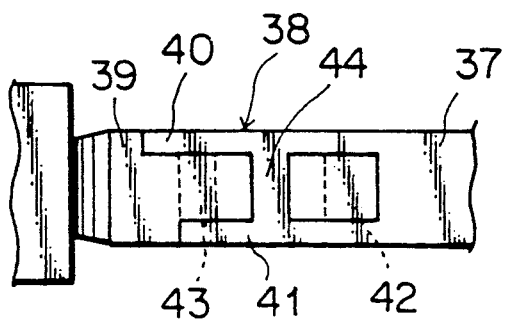

FIG. 6 is a perspective view of still another example of the connecting portion. FIGS. 7a and 7b are a cross-sectional view and a plan view of the connecting portion of FIG. 6 in a connected state.

The connecting portion b" consists of ladder portion 38 formed at the frontal part of the major portion 37, with the stairs of the ladder portion staggered in the direction of the major portion thickness (vertical direction). The projecting piece 39 of the next tying band is fused into the ladder portion 38. The ladder portion consists of: two parallel pillar portions 40, 41, one of them extending forwardly longer than the other; a lower-side stair portion 42 formed continuous with the major portion 37; another lower-side stair portion 43 arranged opposite to and at the same level of the first lower-side stair portion 42 and bridging the two pillar portions 40, 41; and an upper-side stair portion 44 bridging the two parallel pillar portions 40, 41 between the first and second lower-side stair portions 42, 43.

Figure 8A:
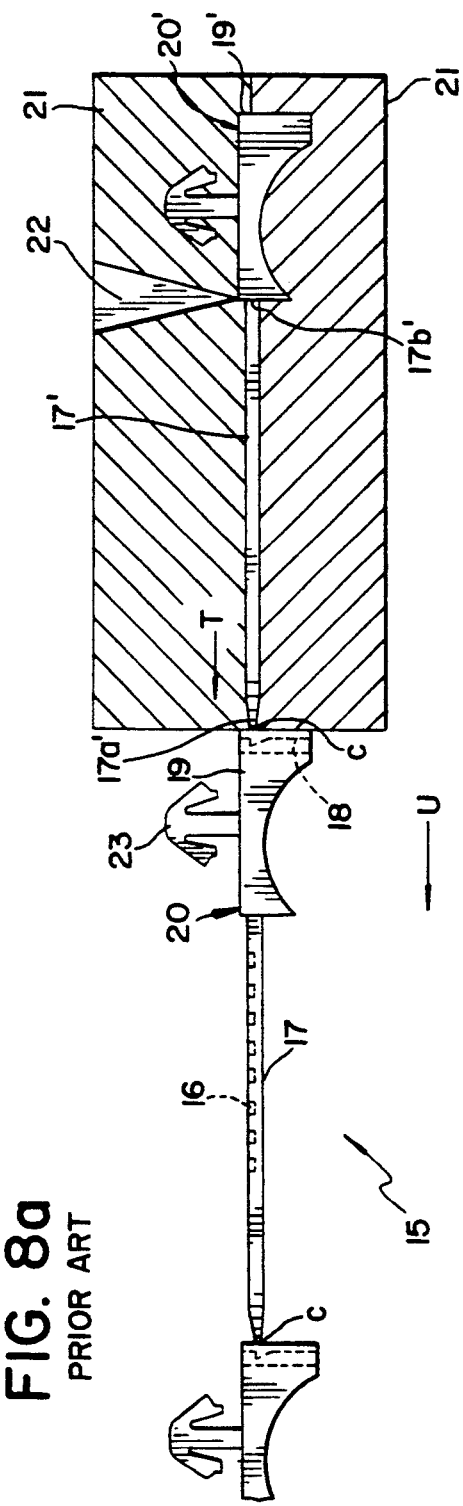
Figure 8B:
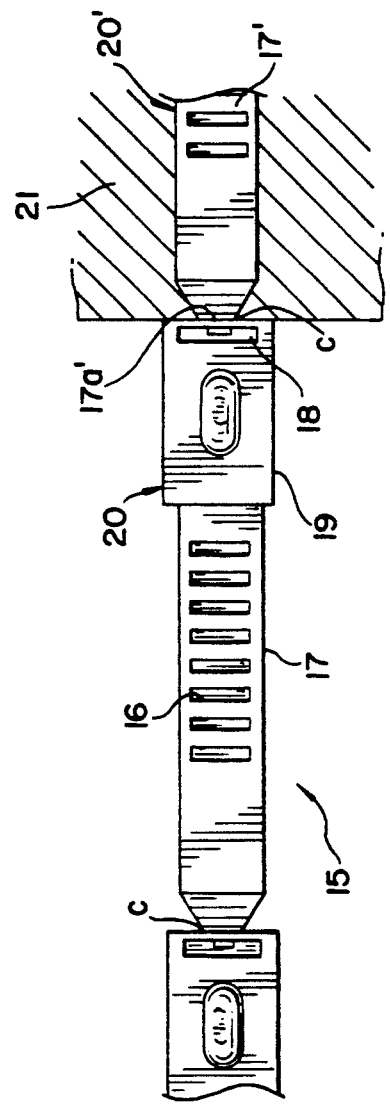
Figure 9:
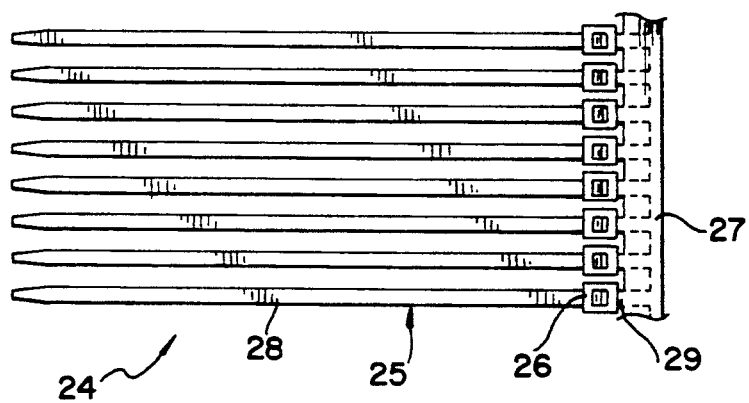
FIG. 9 is a plan view of another conventional tying band cluster.

Since the projecting piece 39 fuses with the ladder portion 38, shaping into a complicated form like a crank, the strength of the connecting portion b" increases. The results of tensile strength and repetitive 180-degree bending strength tests conducted on the tying bands of this invention (FIG. 7) and the conventional tying bands (FIG. 8) are shown in the following table for comparison.

Results of Strength Tests (number of tests performed = 10 times each for tensile and bending tests)

| Kind of test | Invention | Prior art |
| --- | --- | --- |
| Tensile test | | |
| Maximum | 18.9 kgf | 3.0 kgf |
| Minimum | 17.7 kgf | 1.9 kgf |
| Average | 18.5 kgf | 2.5 kgf |
| Repetitive bending test | None of ten specimens was not broken when they were subjected to bending 5 times. | All ten specimens were broken when they were subjected to bending one time. |

The above results indicate that the tying bands of this invention have a far greater mechanical strength than that of the conventional tying bands.

As mentioned above, with this invention the strength of the connecting portions that connect the tying bands together is greatly enhanced, preventing the connecting portions from breaking off during the operation of the automatic bundling machine, ensuring a smooth bundling work. Furthermore, since no connecting strip is employed as used on the conventional tying band cluster, the material cost is reduced.

What is claimed is:

1. A tying band cluster comprising:
   a plurality of tying bands connected to each other in series, end to end, at longitudinal ends thereof and in a longitudinal direction wherein a width of the tying band cluster is equal to a width of one of said plurality of tying bands;
   each of said tying bands comprising:
   a band body;
   a head portion formed at one end of the band body;
   a projecting piece formed at one end of the head portion; and
   a major portion of the band body formed at another end of the head portion;
   whereby the projecting piece of the currently formed tying band is fused with a free end of the major portion of the previous tying band thereby defining a connection and when the typing band is used for tying up wires or other objects, the free end of the band body is inserted into and engaged with the head portion of the tying band.

2. A tying band cluster as claimed in claim 1, wherein said major portion of said band body includes a ladder portion formed at the free end thereof, said ladder portion comprising:
   parallel pillars on each side of said band body, defining a space therebetween,
   stair portions connecting said parallel pillars, said stair portions disposed in a lateral direction with respect to said parallel pillars, and having a thickness which is less than a thickness of the major portion of the band body, and arranged such that each stair portion is flush with an opposite surface of said band body from a previous stair portion.

3. A tying band cluster, comprising:
   a plurality of tying bands connected in series, end to end, in a longitudinal direction, each of said tying bands comprising:
   a band body;
   a head portion formed at one end of the band body;
   a projecting piece formed at one end of the head portion; and a major portion of the band portion of the band body formed at another end of the head portion, said major portion having a groove and a hole formed at a free end thereof, into which the projecting piece of a next tying band is fused, whereby the projecting piece of the currently formed tying band is fused with the free end of the major portion of the previous tying band and when the tying band is used for tying up wires or other objects, the free end of the band body is inserted into and engaged with the head portion of the tying band.

* * * * *